(12) United States Patent
Szczepski

(10) Patent No.: US 6,502,797 B1
(45) Date of Patent: Jan. 7, 2003

(54) PORTABLE MOTORCYCLE SUPPORT STAND

(75) Inventor: George Richard Szczepski, Cambridge (CA)

(73) Assignee: Spike Limited, Cambridge (CA)

( * ) Notice: Subject to any disclaimer, the term of this patent is extended or adjusted under 35 U.S.C. 154(b) by 0 days.

(21) Appl. No.: 10/051,177

(22) Filed: Jan. 22, 2002

(51) Int. Cl.[7] .................................................. A47F 5/00
(52) U.S. Cl. ...................................... 248/352; 280/293
(58) Field of Search ............................... 248/352, 346; 280/293, 301, 302, 303

(56) References Cited

U.S. PATENT DOCUMENTS

| | | | |
|---|---|---|---|
| 4,348,010 A | | 9/1982 | Baxter |
| 4,420,164 A | * | 12/1983 | Mitchell ................... 248/352 |
| D276,988 S | | 1/1985 | Shedden |
| 4,541,650 A | * | 9/1985 | Cline ....................... 182/200 |
| 4,775,164 A | * | 10/1988 | Jan ......................... 254/133 R |
| 5,234,225 A | * | 8/1993 | Yaple ....................... 180/219 |
| 5,388,848 A | * | 2/1995 | Silva et al. ................ 280/300 |
| 5,639,906 A | | 6/1997 | Johnson |
| 5,769,397 A | * | 6/1998 | Dhein ....................... 254/134 |
| 6,341,763 B1 | * | 1/2002 | Lefebvre ................... 254/131 |
| 2002/0113230 A1 | * | 2/2001 | Creel et al. |

OTHER PUBLICATIONS

U.S. Publication No. 2002/0113230 A1, Feb. 2001, Creel et al.*

* cited by examiner

Primary Examiner—Ramon O. Ramirez
Assistant Examiner—Kofi Schultenbrandt
(74) Attorney, Agent, or Firm—R. Craig Armstrong

(57) ABSTRACT

A portable motorcycle support stand has a main member with a first protrusion arranged at one end of the main member and a second protrusion arranged at an opposite end of the main member. The first protrusion and the second protrusion protrude in the same general direction. A movable cross-member is arranged on the first protrusion at one end of the movable cross-member and on the second protrusion at an opposite end of the movable cross-member. Retainers are used to secure the movable cross-member at a desired position from the main member, to thereby set the height of the stand. Further, an arm is movable on the first protrusion between a storage position, in which a longitudinal direction of the arm is generally parallel to a longitudinal direction of the main member, and an operating position, in which the longitudinal direction of the arm is pivoted out at an angle from the longitudinal direction of the main member. The movable cross-member has a soft cover, for preventing damage to the motorcycle when said stand is in use.

19 Claims, 15 Drawing Sheets

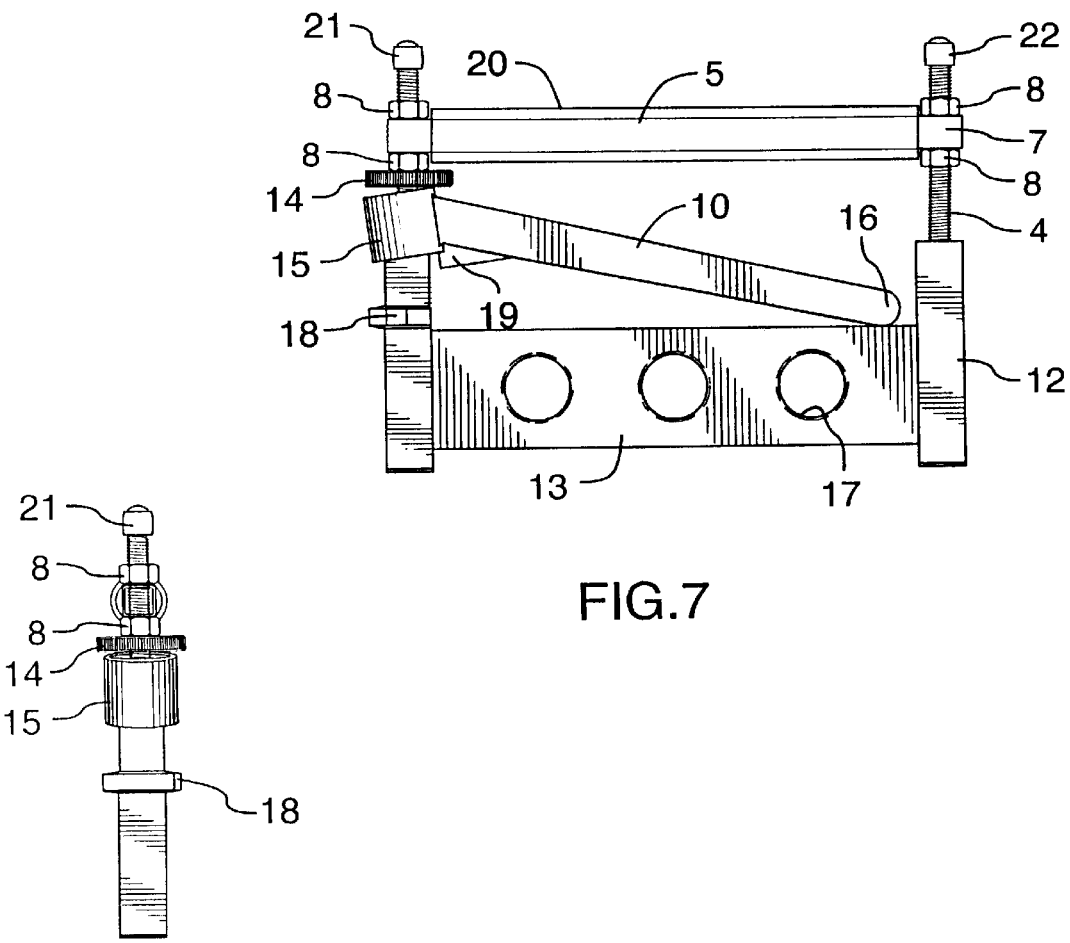
FIG.7
FIG.8
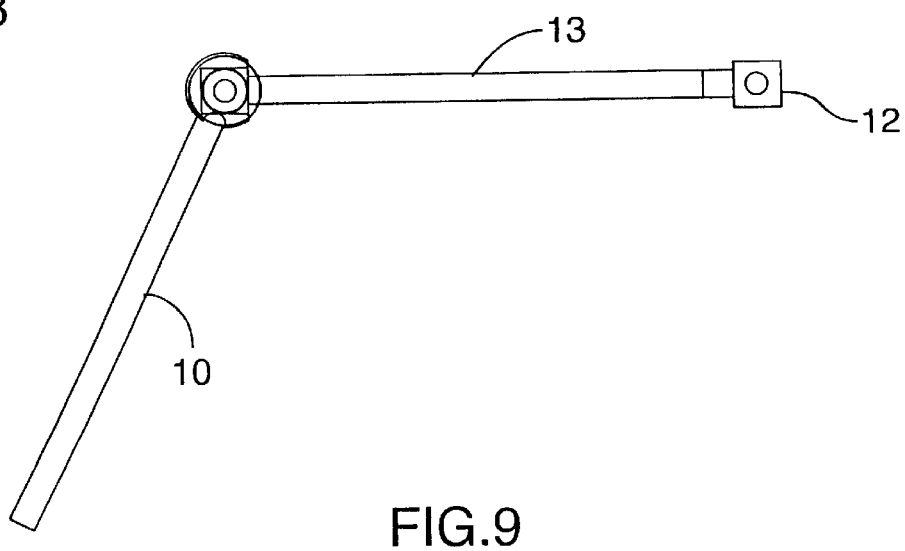
FIG.9

PORTABLE MOTORCYCLE SUPPORT STAND

FIELD OF THE INVENTION

The present invention relates generally to motorcycle support stands, more particularly to portable motorcycle support stands.

BACKGROUND OF THE INVENTION

DESCRIPTION OF THE PRIOR ART

Most motorcycles have at least a kickstand attached to the motorcycle at one side. The kickstand swings out from a storage position, generally parallel to the longitudinal axis of the motorcycle, to an operating position, generally perpendicular to the longitudinal axis of the motorcycle. When the kickstand is to be used, it is moved from the storage position to the operating position and the motorcycle is tilted sideways so that a distal end of the kickstand touches the ground and keeps the motorcycle generally upright. An apparent drawback with these stands is that both wheels of the motorcycle still touch the ground and carry the bulk of the motorcycle weight. A further apparent disadvantage is that the motorcycle has to lean somewhat to one side in order for the motorcycle to be in a stable position, when it leans on the kickstand. The motorcycle is thus possibly easier tipped over, than if the stand had more than one support point to the ground. The ground furthermore has to be fairly solid, to prevent the kickstand from sinking into it.

Certain motorcycles have a two support point stand fastened to the motorcycle. These stands are inherently more stable than the earlier described type of stands, but usually detract from the lowest height of the motorcycle and/or detract from the aesthetics of the motorcycle because of their often bulky appearance.

A jack for elevating a motorcycle so that either wheel is off the ground is shown in U.S. Pat. No. 5,639,067. The jack is relatively compact, for portability, but its construction is complex, with higher manufacturing costs and possible easier failure due to breakage as results. The jack has a main axle supported at each end by ground supports. A roller mechanism is pivotably attached parallel to the axis and is pivoted by the use of a ratchet wrench (or similar) applied to one end of the axle. This means the user has to crouch down adjacent the axle to lift the motorcycle up onto the roller.

A motorcycle stand that is separate from the motorcycle is disclosed in U.S. Design Pat. No. 276,988. This stand works according to the lever principle, having a portion that fits under the motorcycle and a lever to lift the motorcycle once the stand is tilted by the lever. The described stand has the apparent drawbacks of a weak construction and an apparently time-consuming way of disassembling the stand for storage, using a wing nut or similar.

It is, therefore, desirable to provide a motorcycle stand, which is portable and which can be easily stored on the motorcycle when the stand is not in use, thus a stand which does not require a large space when stored.

SUMMARY OF THE INVENTION

It is an object of the invention to mitigate and/or obviate the above mentioned disadvantages to provide a portable motorcycle stand, which is small in dimensions but sturdy enough for heavy motorcycles, and is easy to operate and assemble/disassemble.

According to a first embodiment of the invention, a portable motorcycle support stand comprises:

a main member having a first protruding member arranged at one end of the main member and a second protruding member arranged at an opposite end of the main member, the first protruding member and the second protruding member protruding in the same general direction;

a movable cross-member, movably arranged on the first protruding member at one end of the movable cross-member and on the second protruding member at an opposite end of the movable cross-member;

retaining means on said first protruding member and said second protruding member to secure the movable cross-member at a desired position along the first protruding member and the second protruding member, respectively;

an arm movably arranged on the first protruding member, the arm being movable between a storage position, in which the arm is generally parallel to a longitudinal direction of the main member, and an operating position, in which a longitudinal direction of the arm is pivoted out at an angle from the longitudinal direction of the main member.

Preferably, the main member has a first tower and a second tower rigidly connected to each other by a stationary cross-member, the first tower having the first protruding member arranged at one end of the first tower and the second tower having the second protruding member arranged at one end of the second tower.

Preferably, the first protruding member has a first end stop and the second protruding member has a second end stop, for preventing damage to the motorcycle when the stand is in use or being stored.

According to a second embodiment of the invention, a portable motorcycle support stand comprises:

a main member having a first protruding member slidingly arranged at one end of said main member and a second protruding member slidingly arranged at an opposite end of said main member, said first protruding member and said second protruding member protruding in the same general direction;

a movable cross-member, attached to a free end of said first protruding member at one end of said movable cross-member and to a free end of said second protruding member at an opposite end of said movable cross-member;

retaining means on said first protruding member and said second protruding member to secure said movable cross-member to said first protruding member and said second protruding member;

adjusting means arranged on said first protruding member and said second protruding member to set a distance from said main member to said movable cross-member;

an arm movably arranged on said first protruding member, said arm movable between a storage position, in which the arm is generally parallel to a longitudinal direction of said main member, and an operating position, in which a longitudinal direction of said arm is pivoted out at an angle from said longitudinal direction of said main member.

The main member preferably has a first tower and a second tower rigidly connected to each other by a stationary cross-member, the first tower having the first protruding member slidingly arranged at one end of the first tower, and the second tower having the second protruding member slidingly arranged at one end of the second tower.

The following is for both embodiments of the invention:

Advantageously, an arm hold-down means is movably arranged on the first protruding member, for preventing the arm from sliding on the first protruding member, when the hold-down means is in a locking position, and enabling the arm to slide on the first protruding member, when the hold-down means is in an un-locked position.

A first guide means is preferably arranged on the arm cooperating with a second guide means arranged on the first tower, to fix the arm, with respect to the main member, when the arm is in the operating position.

Advantageously, the movable cross-member has a soft cover, for preventing damage to the motorcycle when the stand is in use.

The main member is preferably made of a light metal alloy, for example an aluminum alloy. Similarly, the arm is preferably made of a light metal alloy, for example an aluminum alloy.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 7 is a side view of the stand shown in FIG. 3;

FIG. 8 is an end view of the stand shown in FIG. 7;

FIG. 9 is a top view of the stand shown in FIG. 5;

DETAILED DESCRIPTION

Figure 1:
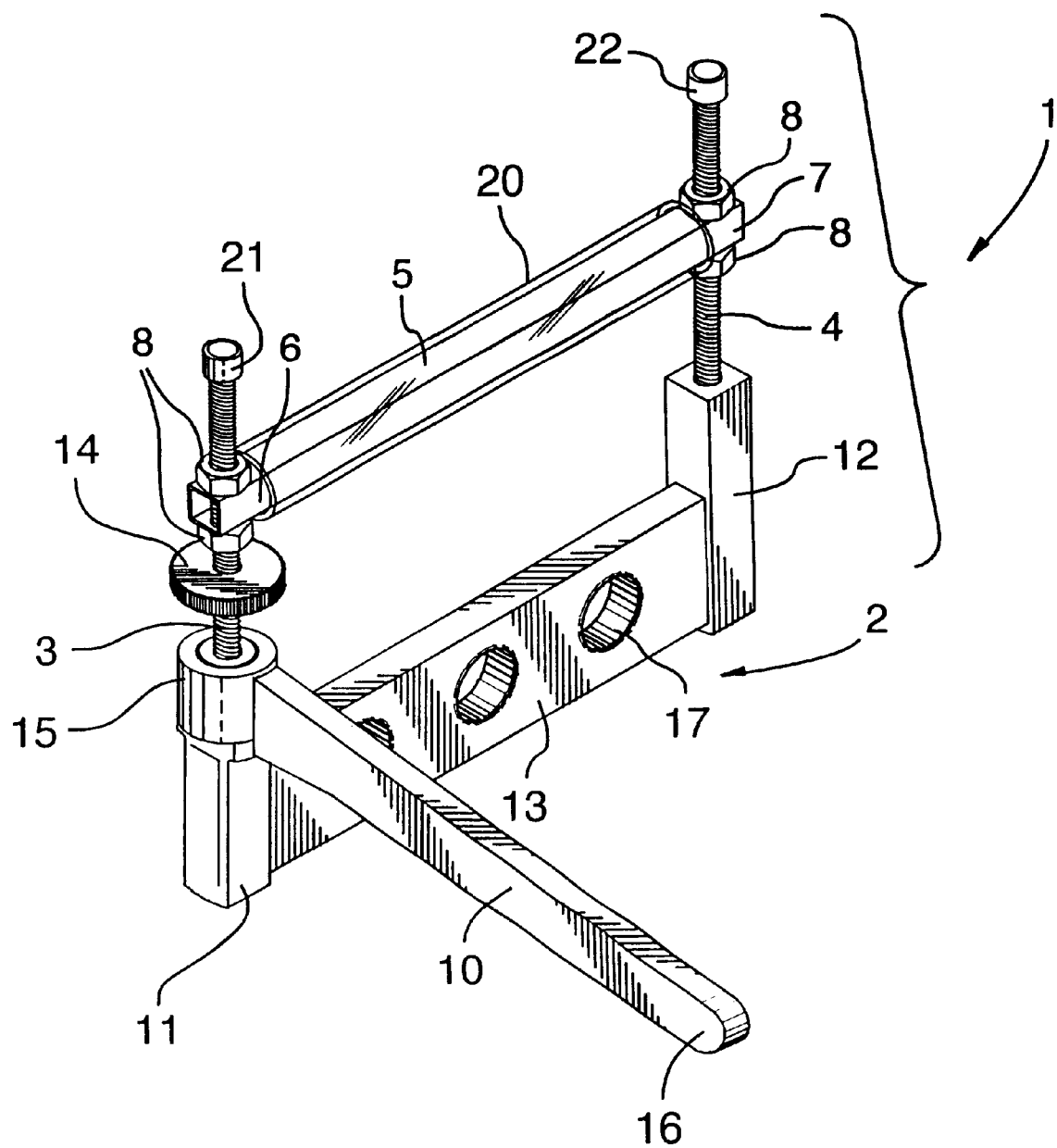
FIG. 1 is an elevational side view of a portable motorcycle stand according to a first embodiment of the invention, showing the arm in its operating position.
Figure 2:
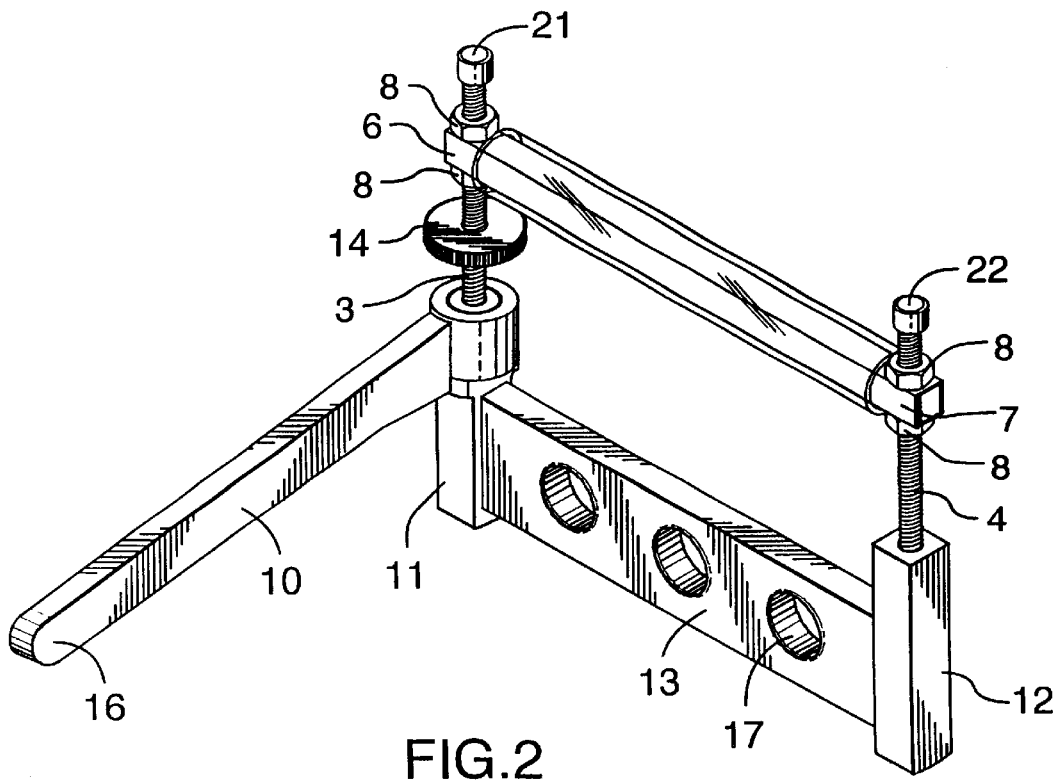
FIG. 2 is an elevational side view of the stand of FIG. 1 seen from a different angle.

Referring to FIGS. 1 to 17, a first embodiment of a portable motorcycle support stand 1 is shown, having a main member 2 with a first protruding member 3 arranged at one end of the main member and a second protruding member 4, arranged at an opposite end of the main member. The first protruding member and the second protruding member are protruding in the same general direction. Further, a movable cross-member 5 is movably arranged on the first protruding member 3 at one end 6 of the movable cross-member 2 and on the second protruding member 4 at an opposite end 7 of the movable cross-member. Retaining means 8 are arranged on the first protruding member and on the second protruding member, to secure the movable cross-member 5 at a desired position along the first protruding member and the second protruding member, respectively. The first protruding member and the second protruding member are, for example, threaded bars onto which the movable cross-member is slidably mounted via through holes 9. The retaining means 8 is then preferably nuts arranged one on each side of the movable cross-member as it is mounted onto the protruding members.

Figure 3:
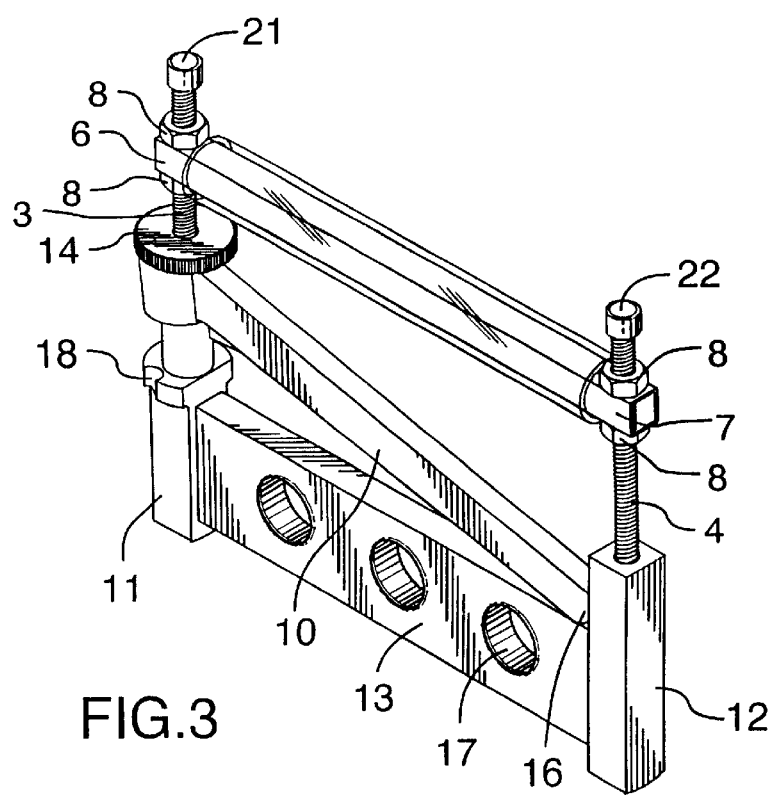
FIG. 3 is an elevational side view of a portable motorcycle stand according to the first embodiment of the invention, showing the arm in its storage position.
Figure 4:
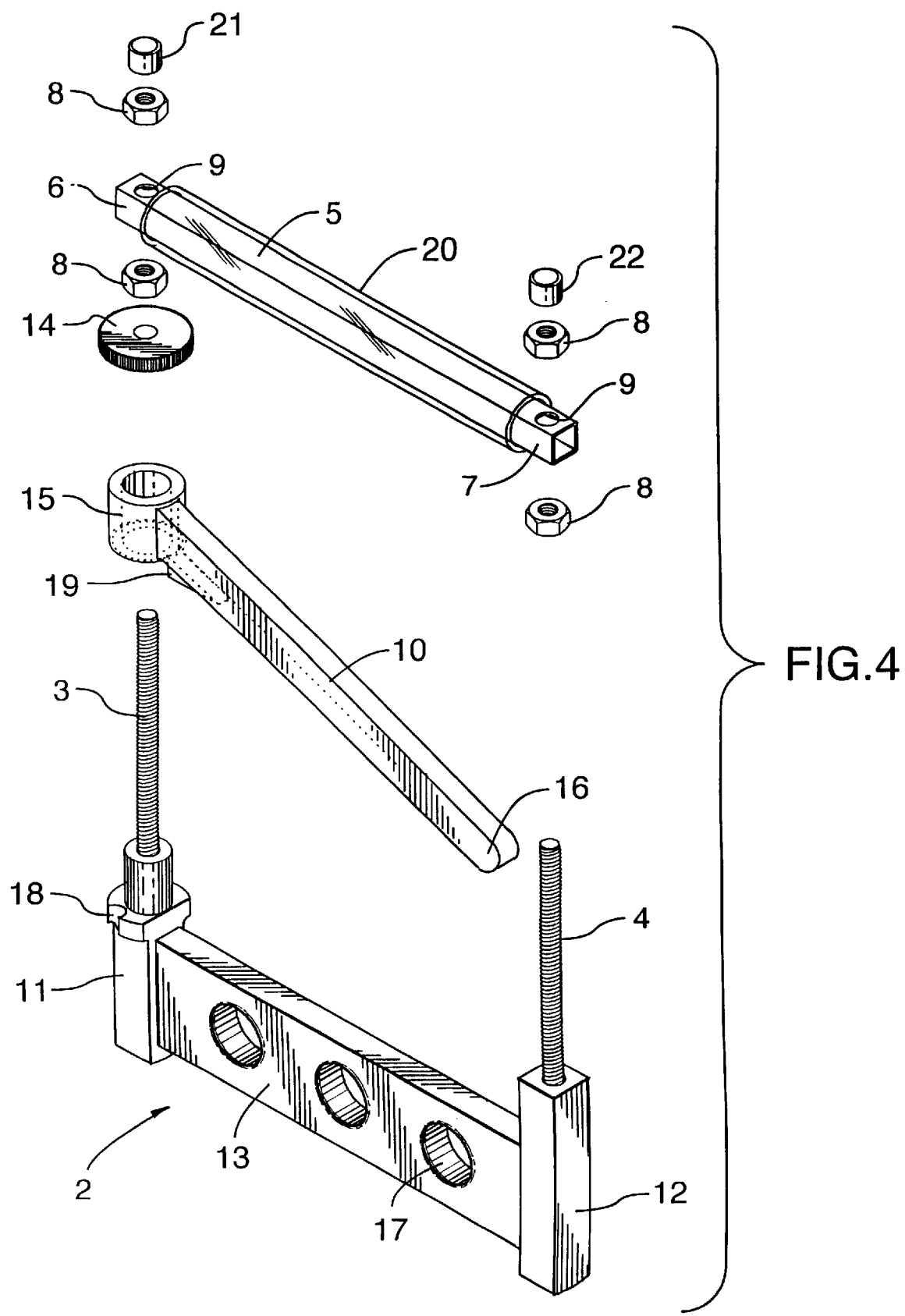
FIG. 4 is an exploded elevational side view of a portable motorcycle stand according to the first embodiment of the invention.
Figure 5:
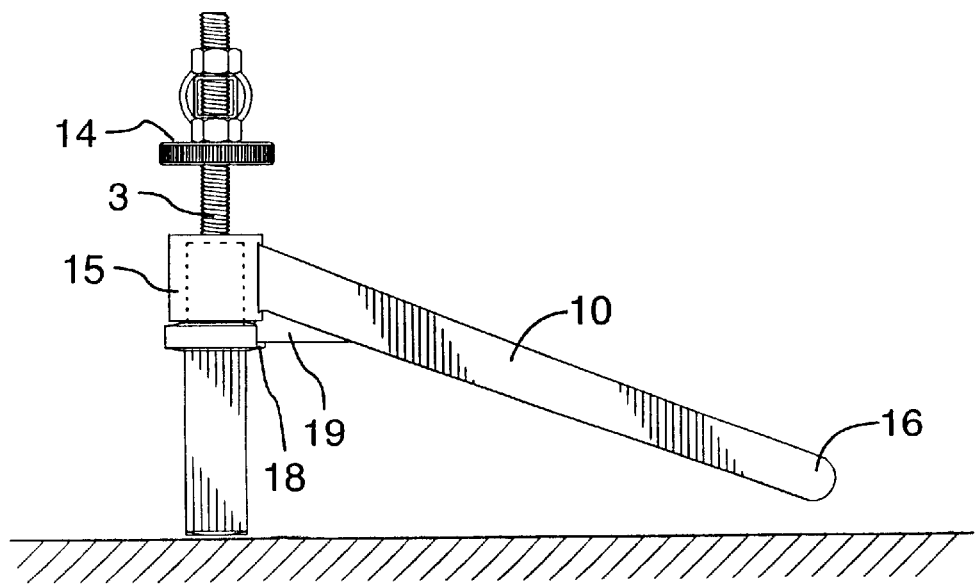
FIG. 5 is an end view of the stand shown in FIG. 1, showing the stand perpendicular to a ground plane.
Figure 6:
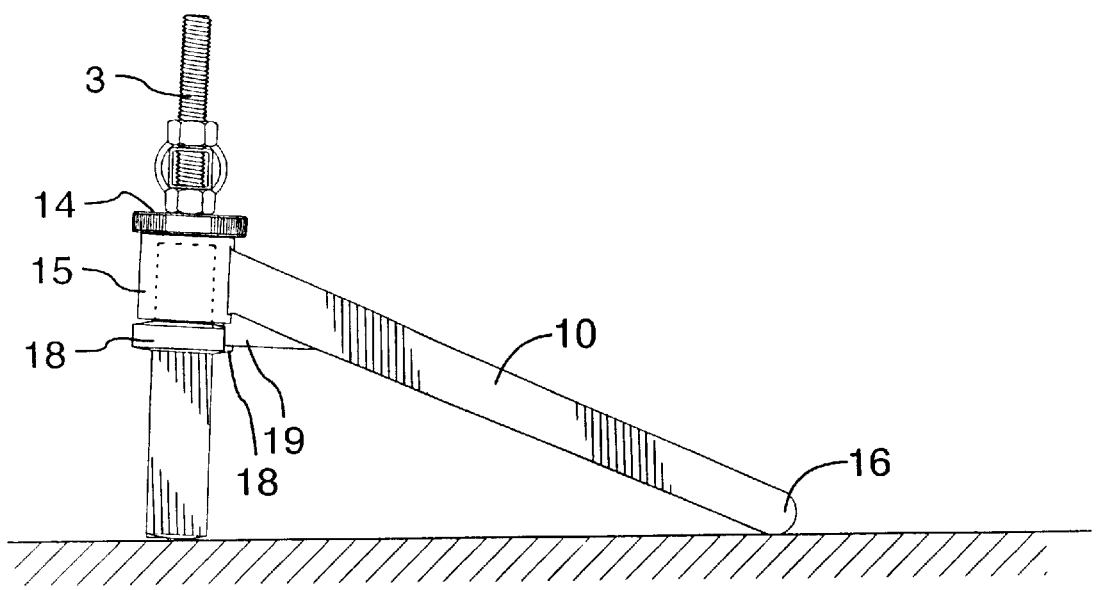
FIG. 6 is an end view of the stand shown in FIG. 6, but showing the stand leaning on the arm.
Figure 10:
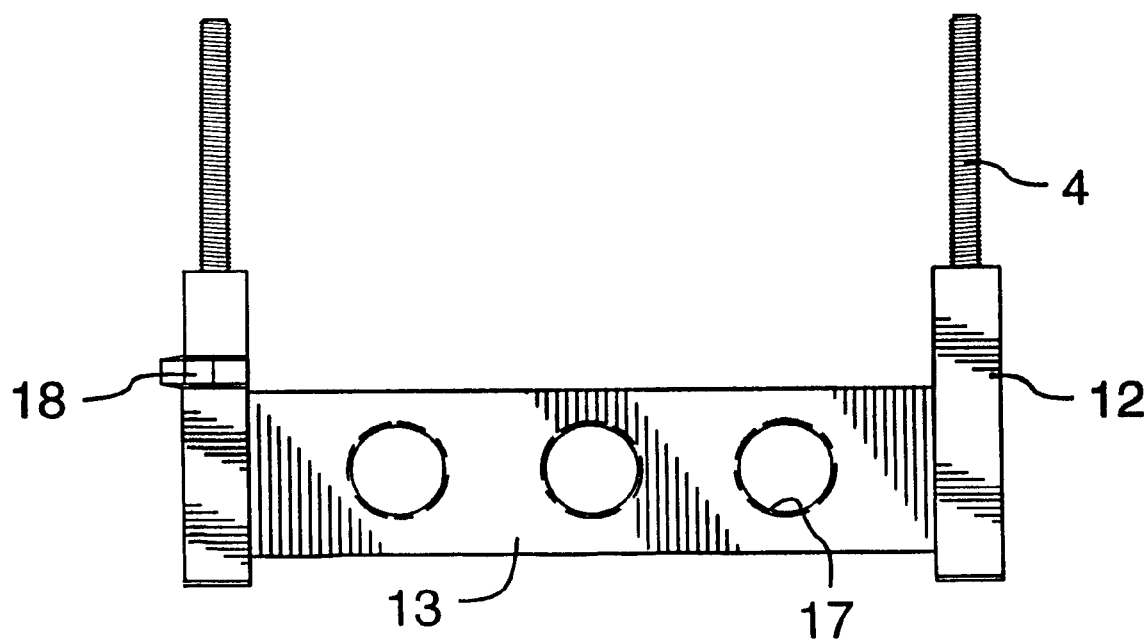
FIG. 10 is a side view of the main member.
Figure 11:
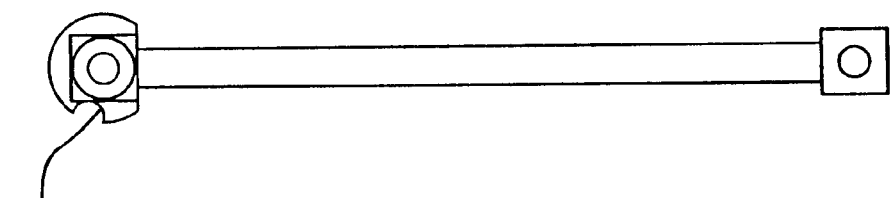
FIG. 11 is a top view of the main member.
Figure 12:
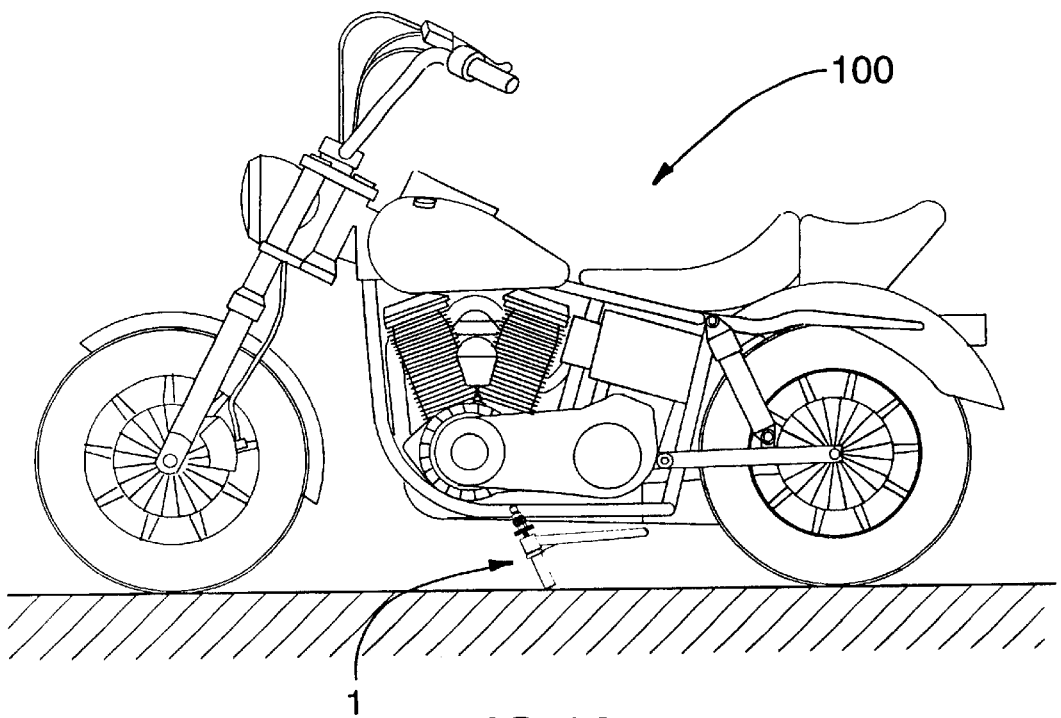
FIG. 12 is an end view of a stand according to the first embodiment of the invention, showing the stand in a position under a motorcycle and ready for rolling the motorcycle up onto the stand.
Figure 13:
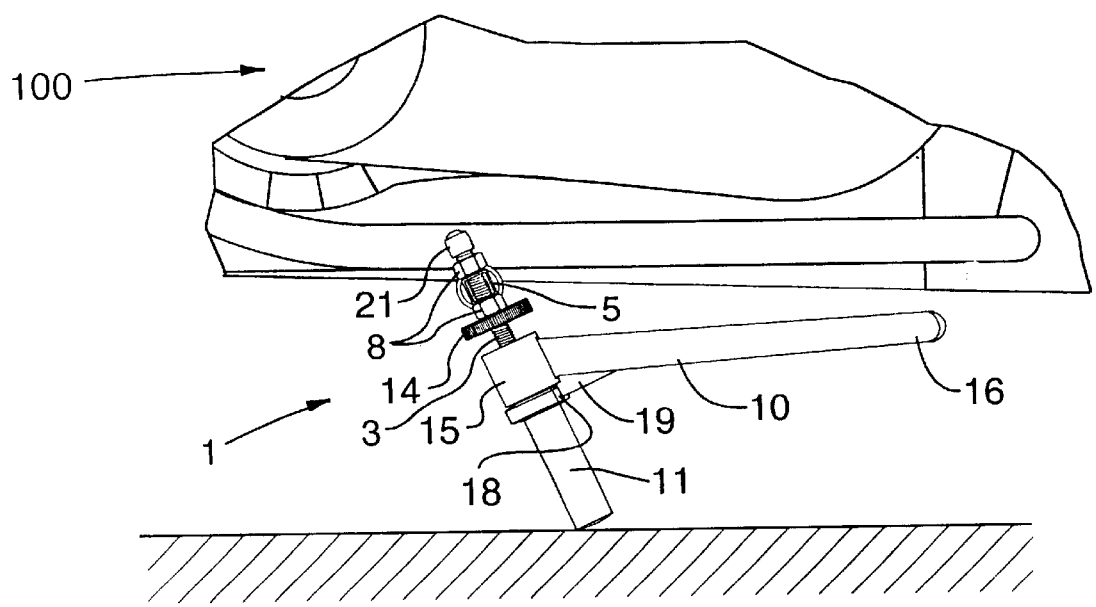
FIG. 13 is an end view detail of FIG. 12.
Figure 14:
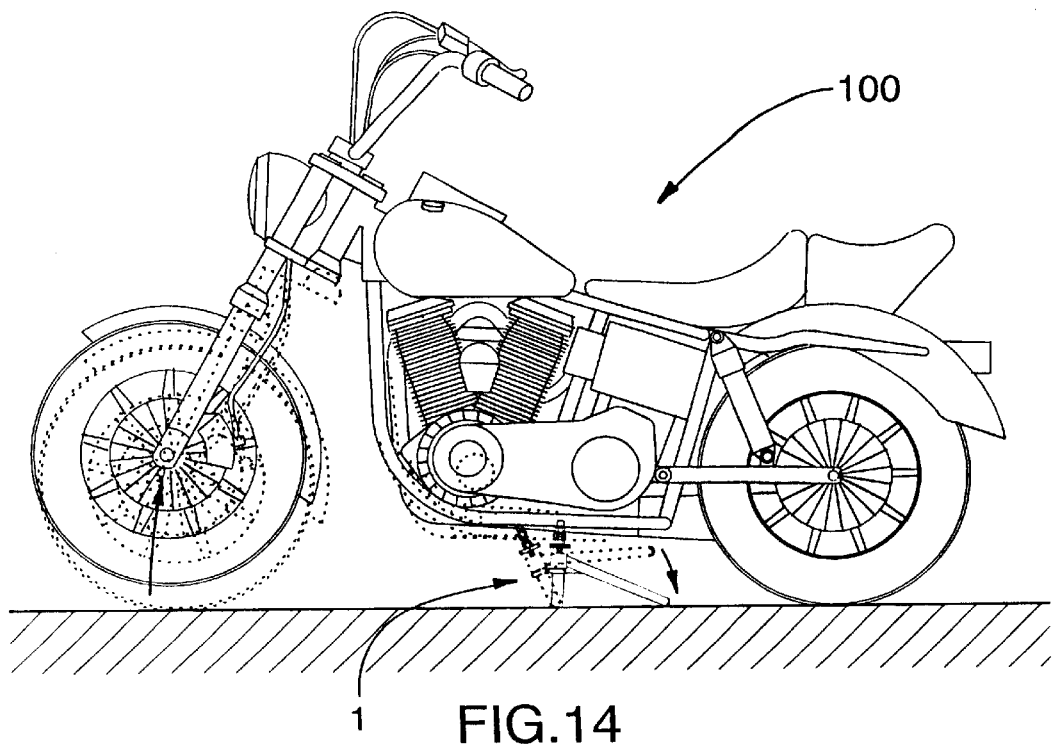
FIG. 14 is an end view of a stand according to the first embodiment of the invention, showing the stand in a position under a motorcycle after the motorcycle has been rolled up onto the stand.
Figure 15:
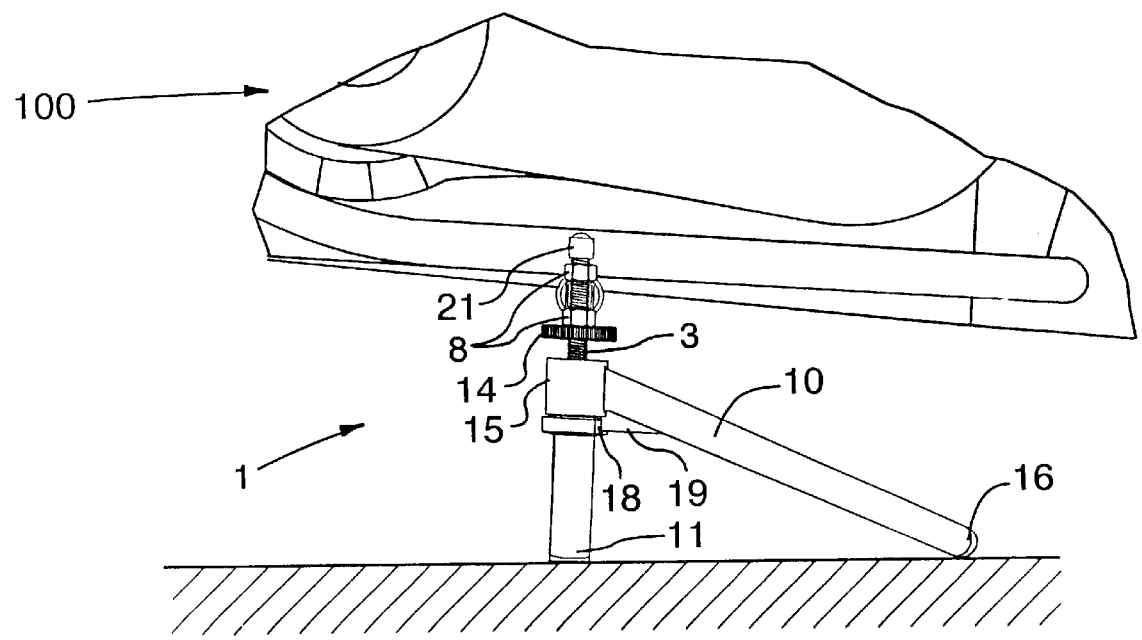
FIG. 15 is an end view detail of FIG. 14.
Figure 16:
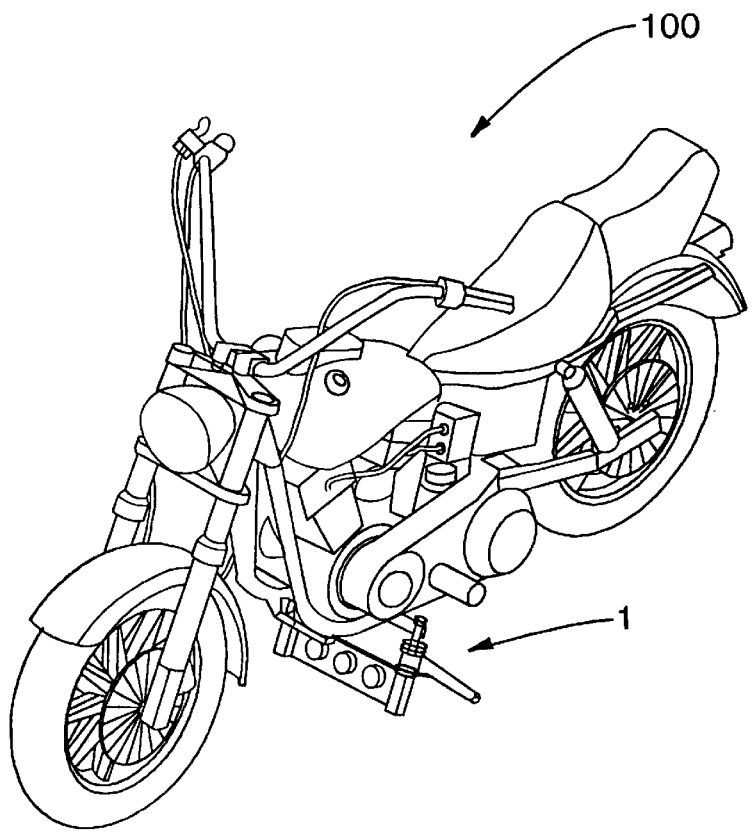
FIG. 16 is an elevational side view of a motorcycle on a stand according to the first embodiment of the invention, as shown in FIG. 14.
Figure 17:
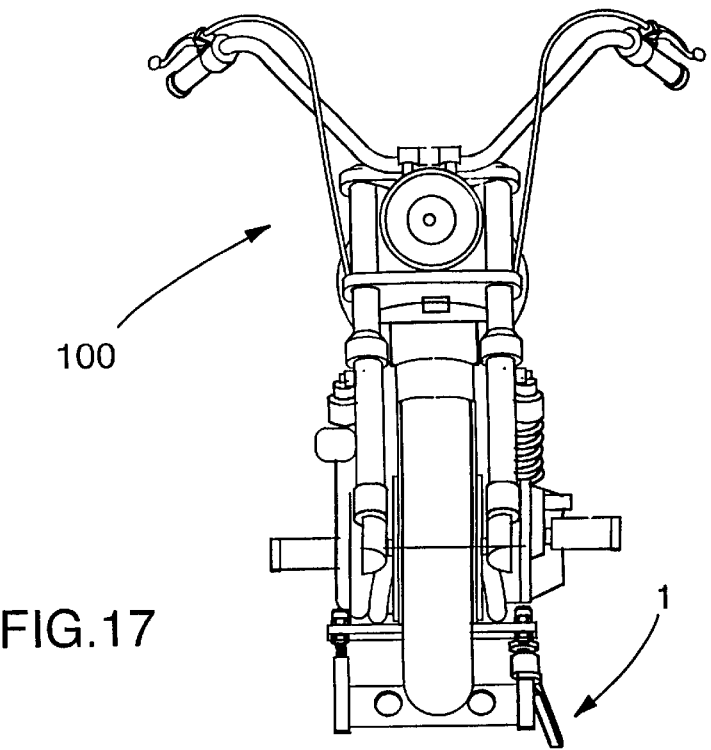
FIG. 17 is a front view of FIG. 16.
Figure 18:
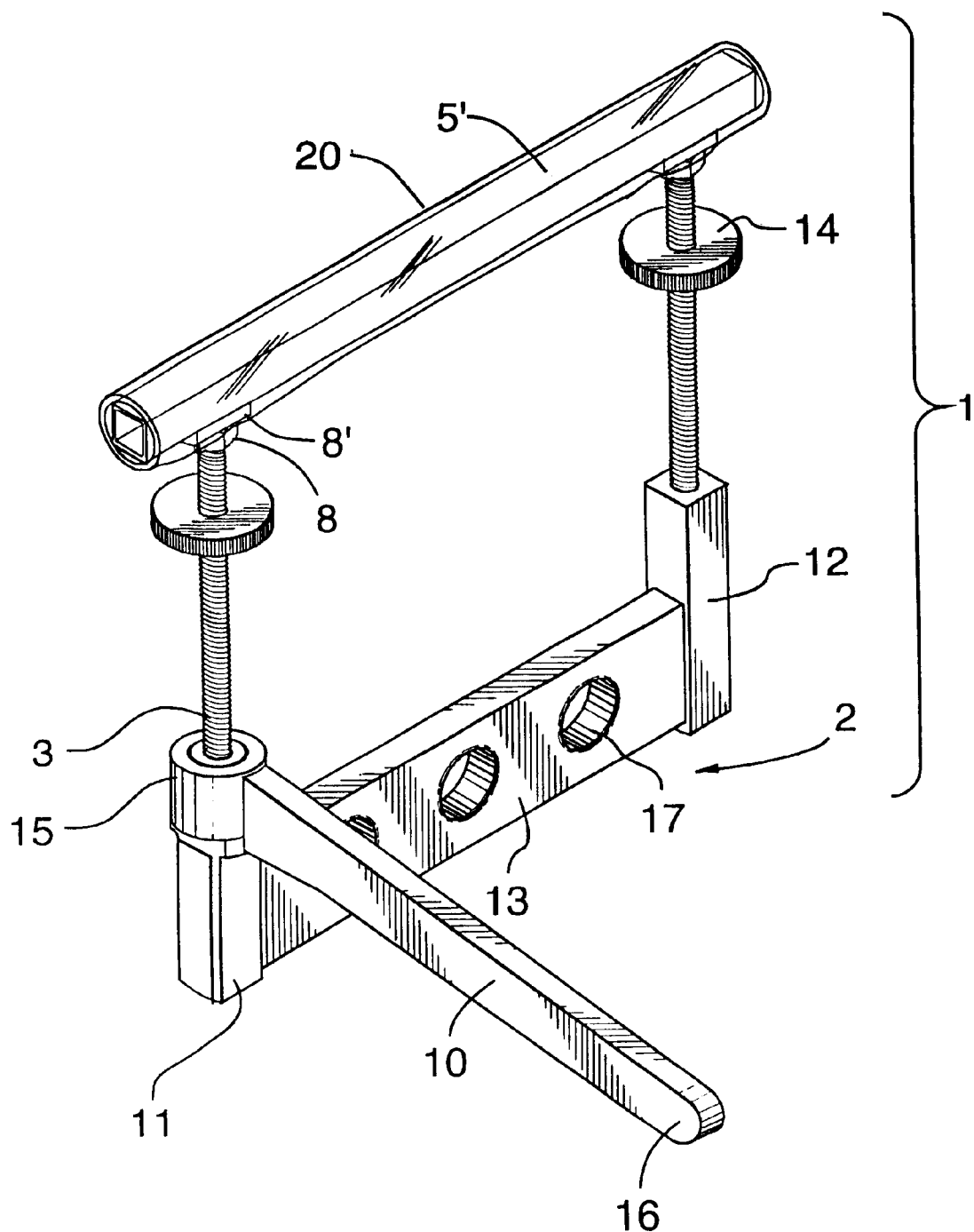
FIG. 18 is an elevational side view of a portable motorcycle stand according to a second embodiment of the invention, showing the arm in its operating position.
Figure 19:
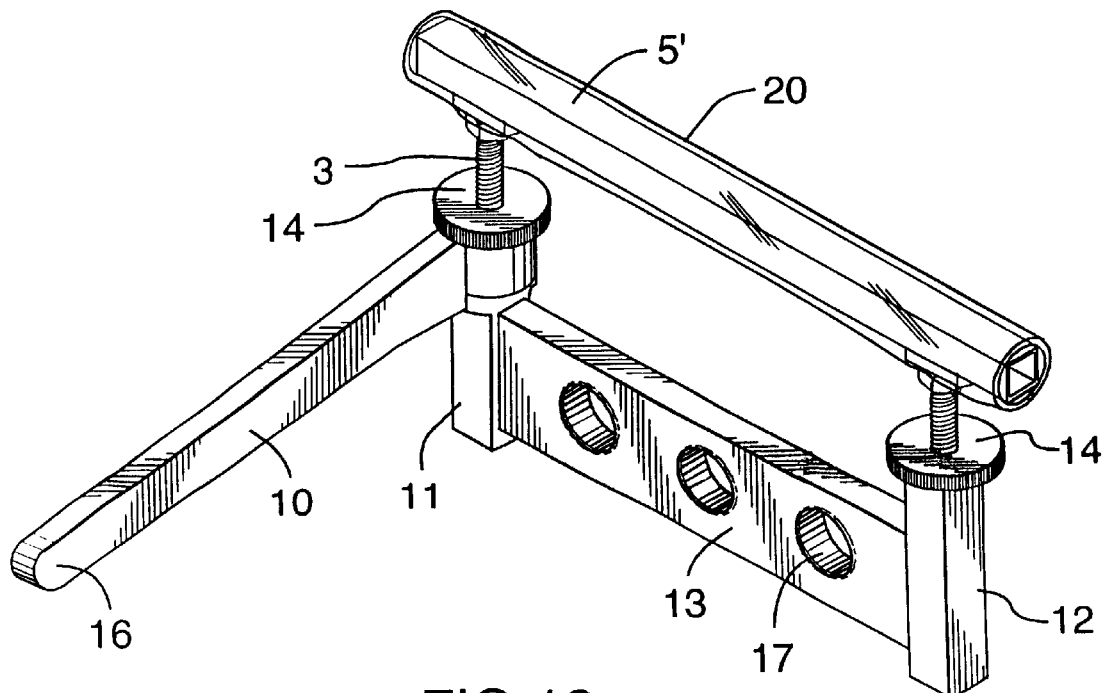
FIG. 19 is an elevational side view of the stand of FIG. 18 seen from a different angle.
Figure 20:
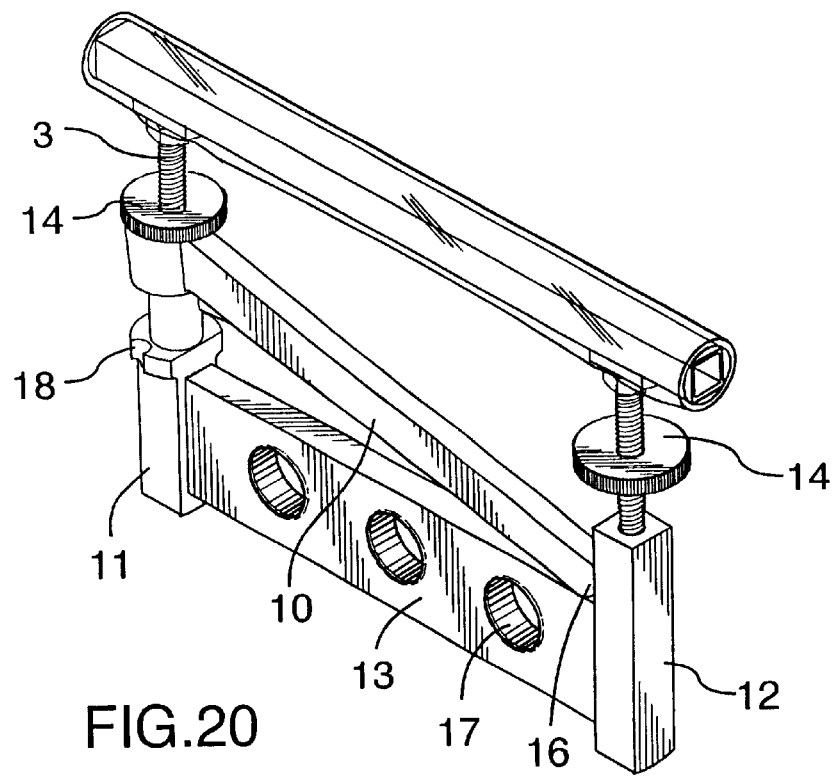
FIG. 20 is an elevational side view of a portable motorcycle stand according to the second embodiment of the invention, showing the arm in its storage position.
Figure 21:
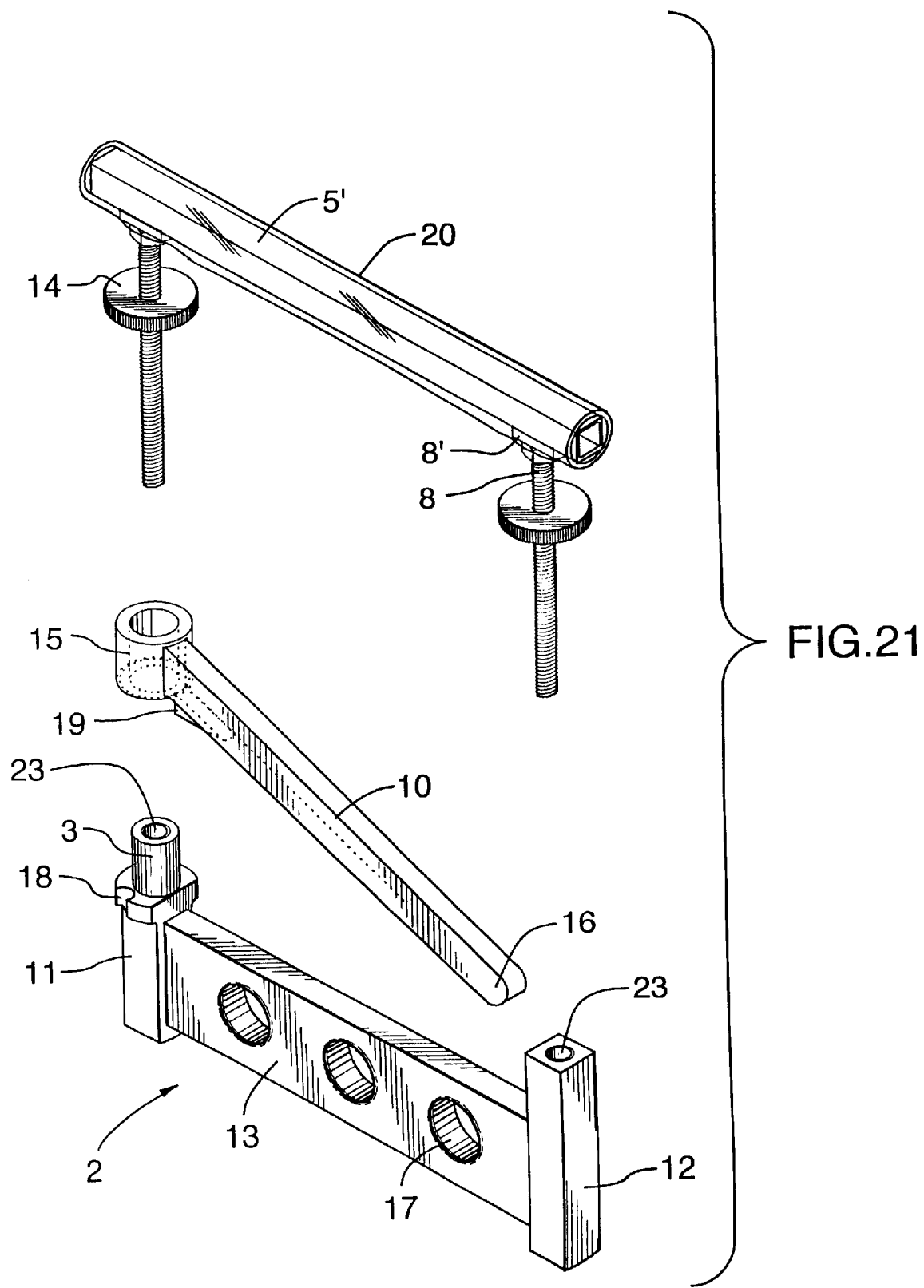
FIG. 21 is an exploded elevational side view of a portable motorcycle stand according to the second embodiment of the invention.
Figure 22:
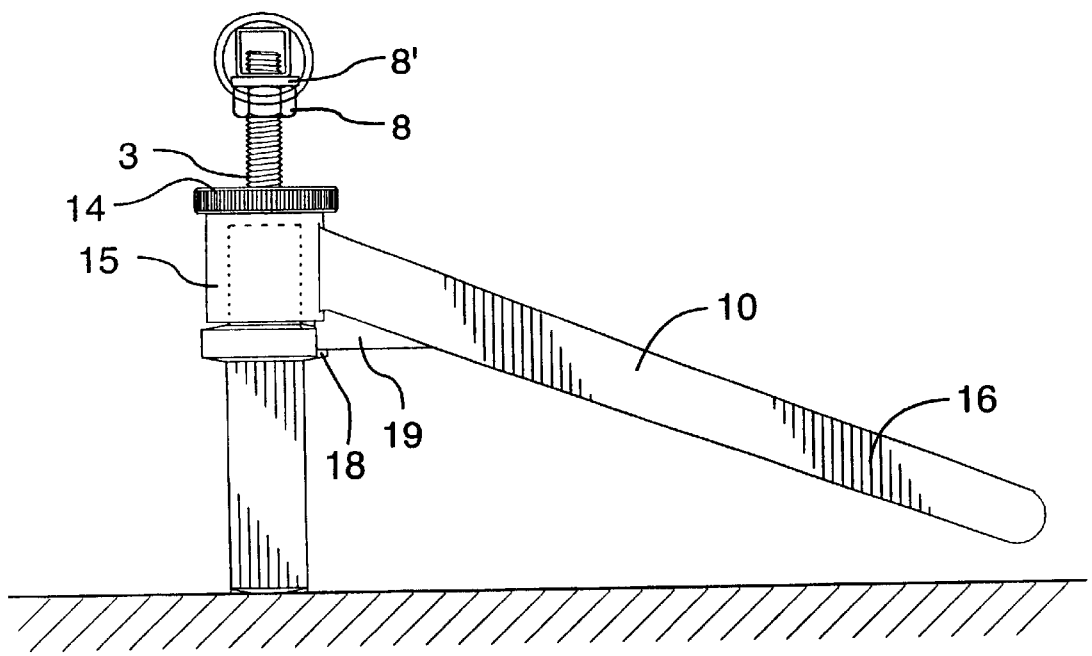
FIG. 22 is an end view of the stand shown in FIG. 18, showing the stand perpendicular to a ground plane.
Figure 23:
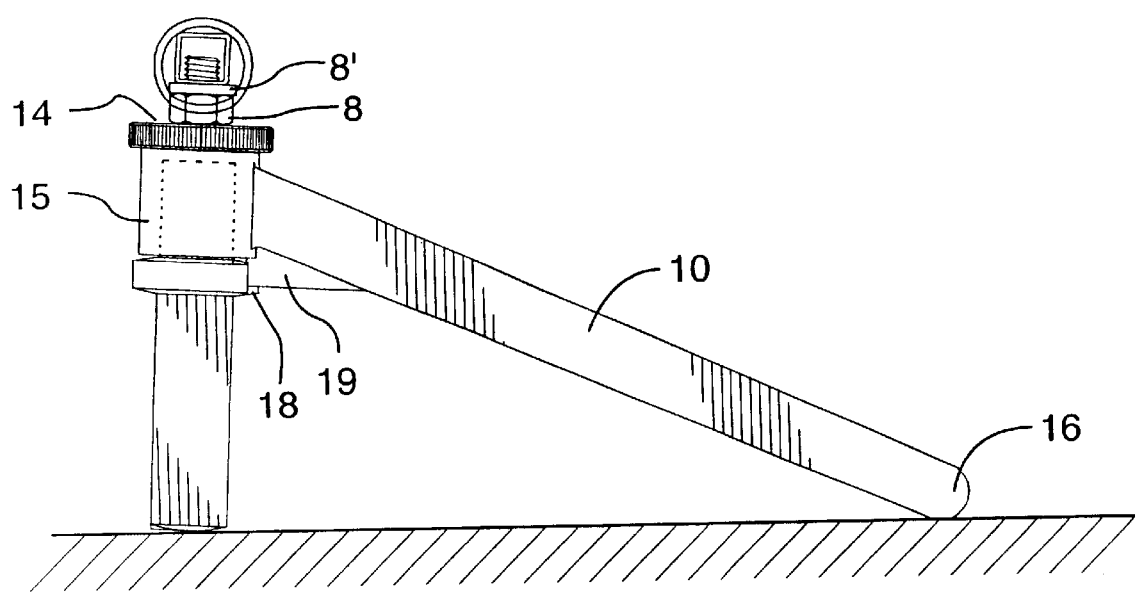
FIG. 23 is an end view of the stand shown in FIG. 22, but showing the stand leaning on the arm.
Figure 24:
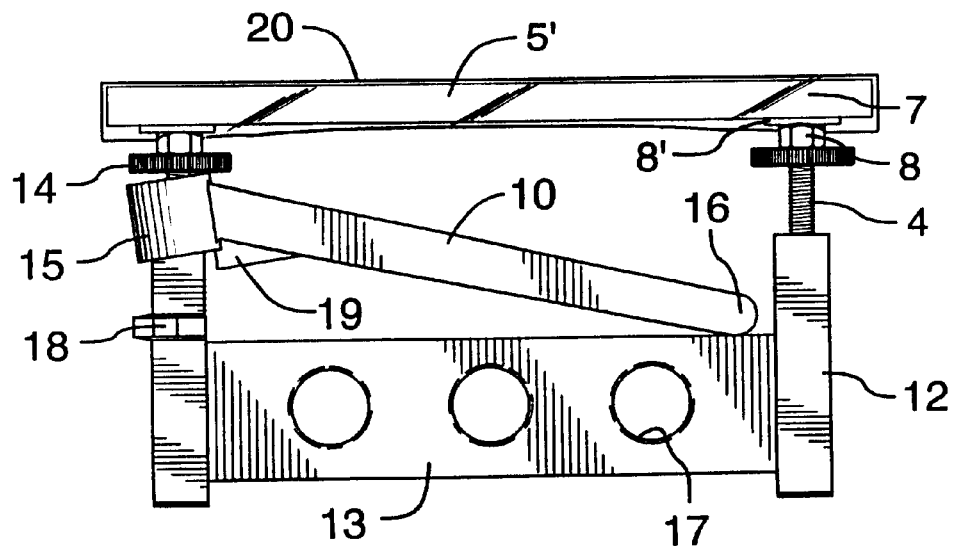
FIG. 24 is a side view of the stand shown in FIG. 20.
Figure 25:
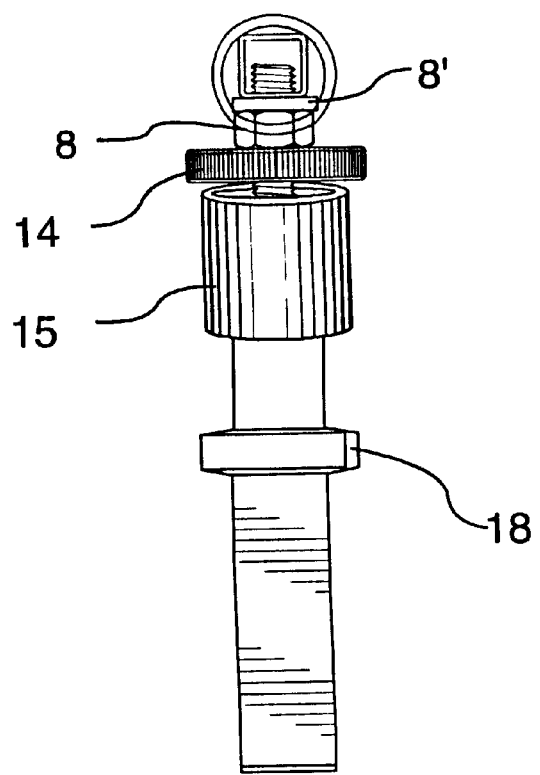
FIG. 25 is an end view of the stand shown in FIG. 24.
Figure 26:
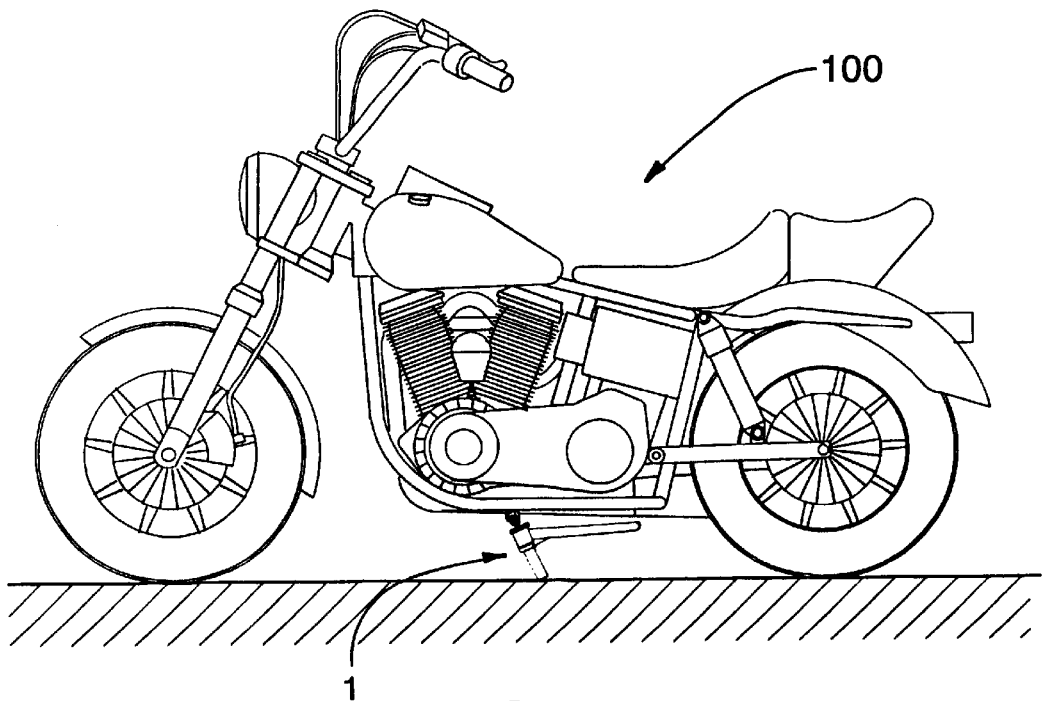
FIG. 26 is an end view of a stand according to the second embodiment of the invention, showing the stand in a position under a motorcycle after the motorcycle has been rolled up onto the stand.
Figure 27:
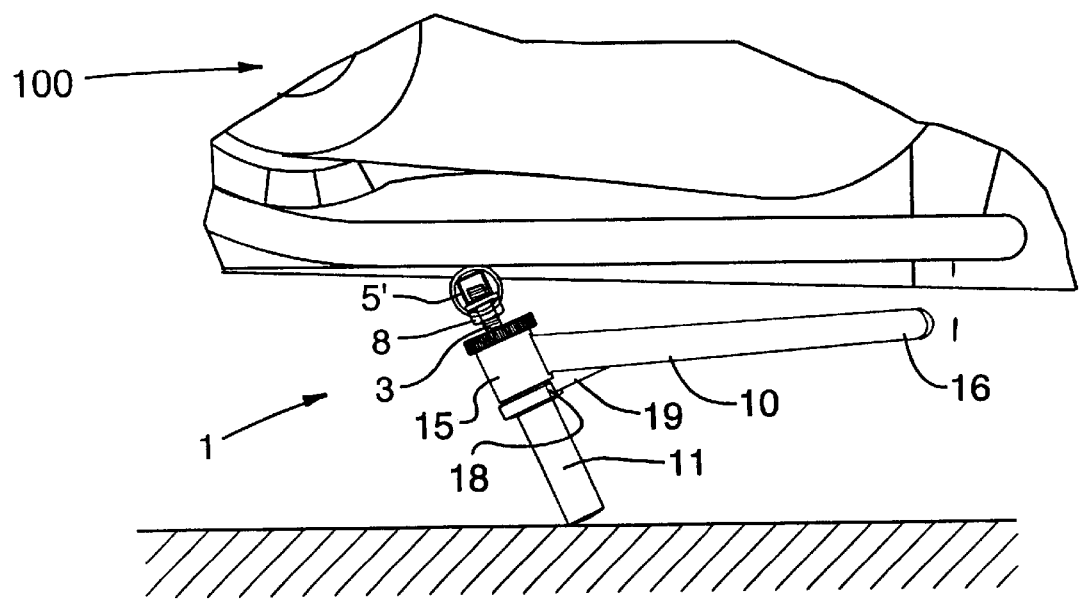
FIG. 27 is an end view detail of FIG. 26.

An arm 10 is movably arranged on the first protruding member 3. The arm is movable between a storage position, in which the arm is generally parallel to a longitudinal direction of the main member 2 (as shown in FIGS. 3 and 7), and an operating position, in which a longitudinal direction of the arm is pivoted out at an angle from the longitudinal direction of the main member (as shown in FIGS. 1, 2, 5, 6, 9 and 12 to 17). The arm further has a first end 15, which is arranged to slide over the first protruding member, and a second end 16, which is arranged to contact the ground or floor, when the stand is in use to support a motorcycle 100 (see FIGS. 12 to 17).

In a first embodiment, the main member 2 has a first tower 11 and a second tower 12 rigidly connected to each other by a stationary cross-member 13, the first tower having the first protruding member 3 arranged at one end of the first tower and the second tower having the second protruding member 4 arranged at one end of the second tower. Advantageously, the stationary cross-member has weight-saving holes 17.

An arm hold-down means 14 is preferably movably arranged on the first protruding member 3, for preventing the arm from sliding on the first protruding member 3, when the hold-down means is in a locking position, and enabling the arm to slide on the first protruding member, when the hold-down means is in an un-locked position. Advantageously, the arm hold-down means 14 is a threaded disc having a grooved circumference for enhanced grip, the disc being easy to manipulate by screwing it up or down to either release or clamp down the arm to the first tower 11 on the first protruding member. Preferably, a first guide means 19 (see FIG. 4) is arranged on the arm 10 cooperating with a second guide means 18 (see FIG. 3) arranged on the first tower, to fix the arm when it is in the operating position. The first guide means is preferably a protrusion on the arm cooperating with a second guide means in the shape of a notch on the first tower.

Advantageously, the movable cross-member 5 has a soft cover 20, for preventing damage to the motorcycle when the stand is in use. Similarly, the first protruding member advantageously has a first end stop 21 and the second protruding member has a second end stop 22, for preventing damage to the motorcycle when the stand is in use or being stored.

FIGS. 18 to 27 show a second embodiment of a motorcycle stand according to the invention. The difference compared to the earlier shown first embodiment is that the movable cross-member 5' does not have through holes but has mounting studs 8' into which the threaded first protruding member 3 and the second protruding member 4 are fixedly attachable. Nuts 8 are preferably used to secure the first and second protruding members in the respective stud. The first and second protruding members are slidably and removably held in holes 23 in the main member 2, so that the assembled movable cross-member with the first and second protruding members, 3 and 4 respectively, can be moved as a unit with respect to the main member. The height of the movable cross-member is set by adjusting the arm hold-down means 14, which is attached to both the first protruding member 3 and the second protruding member 4. To fold the arm 10 in its storage position, the hold-down means 14 of the first protruding member 3 is moved away from the arm and the arm swung to its storage position (see FIG. 20). All other technical features are the same as for the earlier described first embodiment, and use the same reference numbers. The second embodiment of the invention has the added advantage that the part of the movable cross-member 5', which contacts the motorcycle, is smooth without any protruding parts to damage the motorcycle.

For all embodiments of the invention, the main member 2 is preferably made of a light metal alloy, for example an aluminum alloy and preferably cast. The arm is preferably also made of a light metal alloy, for example an aluminum alloy, and also preferably cast. Alternatively, the main member and the arm may be forged or machined, but these metal forming operations tend to be more expensive than casting.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed is:

1. A portable motorcycle support stand comprising
   a main member having a first protruding member arranged at one end of said main member and a second protruding member arranged at an opposite end of said main member, said first protruding member and said second protruding member protruding in the same general direction;
   a movable cross-member, movably arranged on said first protruding member at one end of said movable cross-member and on said second protruding member at an opposite end of said movable cross-member;
   retaining means on said first protruding member and said second protruding member to secure said movable cross-member at a desired position along said first protruding member and said second protruding member;
   an arm movably arranged on said first protruding member, said arm movable between a storage position, in which the arm is generally parallel to a longitudinal direction of said main member, and an operating position, in which a longitudinal direction of said arm is pivoted out at an angle from said longitudinal direction of said main member.

2. The portable motorcycle support stand according to claim 1, wherein said main member has a first tower and a second tower rigidly connected to each other by a stationary cross-member, said first tower having said first protruding member arranged at one end of said first tower and said second tower having said second protruding member arranged at one end of said second tower.

3. The portable motorcycle support stand according to claim 1, wherein an arm hold-down means is movably arranged on said first protruding member, for preventing said arm from sliding on said first protruding member, when said hold-down means is in a locking position, and enabling said arm to slide on said first protruding member, when said hold-down means is in an un-locked position.

4. The portable motorcycle support stand according to claim 2, wherein an arm hold-down means is movably arranged on said first protruding member, for preventing said arm from sliding on said first protruding member, when said hold-down means is in a locking position, and enabling said arm to slide on said first protruding member, when said hold-down means is in an un-locked position.

5. The portable motorcycle support stand according to claim 1, wherein a first guide means is arranged on said arm cooperating with a second guide means arranged on said first tower, to fix said arm, with respect to said main member, when it is in said operating position.

6. The portable motorcycle support stand according to claim 2, wherein a first guide means is arranged on said arm cooperating with a second guide means arranged on said first tower, to fix said arm, with respect to the main member, when it is in said operating position.

7. The portable motorcycle support stand according to claim 1, wherein said movable cross-member has a soft cover, for preventing damage to the motorcycle when said stand is in use.

8. The portable motorcycle support stand according to claim 1, wherein said first protruding member has a first end stop and said second protruding member has a second end stop, for preventing damage to the motorcycle when the stand is in use or being stored.

9. The portable motorcycle support stand according to claim 1, wherein said main member is made of a light metal alloy.

10. The portable motorcycle support stand according to claim 2, wherein said main member is made of an aluminum alloy.

11. The portable motorcycle support stand according to claim 1, wherein said arm is made of a light metal alloy.

12. The portable motorcycle support stand according to claim 2, wherein said arm is made of an aluminum alloy.

13. A portable motorcycle support stand comprising a main member having a first protruding member slidingly arranged at one end of said main member and a second protruding member slidingly arranged at an opposite end of said main member, said first protruding member and said second protruding member protruding in the same general direction;

a movable cross-member, attached to a free end of said first protruding member at one end of said movable cross-member and to a free end of said second protruding member at an opposite end of said movable cross-member;

retaining means on said first protruding member and said second protruding member to secure said movable cross-member to said first protruding member and said second protruding member;

adjusting means arranged on said first protruding member and said second protruding member to set a distance from said main member to said movable cross-member;

an arm movably arranged on said first protruding member, said arm movable between a storage position, in which the arm is generally parallel to a longitudinal direction of said main member, and an operating position, in which a longitudinal direction of said arm is pivoted out at an angle from said longitudinal direction of said main member.

14. The portable motorcycle support stand according to claim 13, wherein said main member has a first tower and a second tower rigidly connected to each other by a stationary cross-member, said first tower having said first protruding member slidingly arranged at one end of said first tower and said second tower having said second protruding member slidingly arranged at one end of said second tower.

15. The portable motorcycle support stand according to claim 13, wherein a first guide means is arranged on said arm cooperating with a second guide means arranged on said first tower, to fix said arm, with respect to said main member, when it is in said operating position.

16. The portable motorcycle support stand according to claim 14, wherein a first guide means is arranged on said arm cooperating with a second guide means arranged on said first tower, to fix said arm, with respect to the main member, when it is in said operating position.

17. The portable motorcycle support stand according to claim 13, wherein said movable cross-member has a soft cover, for preventing damage to the motorcycle when said stand is in use.

18. The portable motorcycle support stand according to claim 13, wherein said main member is made of a light metal alloy.

19. The portable motorcycle support stand according to claim 13, wherein said arm is made of a light metal alloy.

* * * * *